(12) United States Patent
Koh et al.

(10) Patent No.: US 8,111,887 B2
(45) Date of Patent: Feb. 7, 2012

(54) IMAGE PROCESSING METHOD, IMAGE PROCESSING APPARATUS AND IMAGE PROCESSING PROGRAM

(75) Inventors: Sei Koh, Tokyo (JP); Kiyoshi Takagi, Tokyo (JP)

(73) Assignee: Konica Minolta Holdings, Inc., Tokyo (JP)

( * ) Notice: Subject to any disclaimer, the term of this patent is extended or adjusted under 35 U.S.C. 154(b) by 908 days.

(21) Appl. No.: 12/095,957

(22) PCT Filed: Nov. 21, 2006

(86) PCT No.: PCT/JP2006/323169
§ 371 (c)(1),
(2), (4) Date: Jun. 3, 2008

(87) PCT Pub. No.: WO2007/066506
PCT Pub. Date: Jun. 14, 2007

(65) Prior Publication Data
US 2010/0135545 A1    Jun. 3, 2010

(30) Foreign Application Priority Data
Dec. 9, 2005 (JP) .................................. 2005-356615

(51) Int. Cl.
*G06K 9/00* (2006.01)
(52) U.S. Cl. .................. 382/128; 382/131; 382/169
(58) Field of Classification Search .................. 382/128, 382/131, 169
See application file for complete search history.

(56) References Cited

U.S. PATENT DOCUMENTS
| | | | |
|---|---|---|---|
| 7,352,398 B2 * | 4/2008 | Sano | 348/254 |
| 2003/0006714 A1 * | 1/2003 | Choi | 315/169.3 |
| 2006/0056688 A1 * | 3/2006 | Toyoda | 382/169 |

FOREIGN PATENT DOCUMENTS
| | | |
|---|---|---|
| JP | 2003310602 | 11/2003 |
| JP | 2004007238 | 1/2004 |
| JP | 2004173052 | 6/2004 |

* cited by examiner

*Primary Examiner* — Louis Arana
(74) *Attorney, Agent, or Firm* — Lucas & Mercanti, LLP

(57) ABSTRACT

Disclosed are an image processing method, an image processing apparatus, and an image processing program which perform appropriate gradation processing in each brightness region while gradation continuity is maintained. The image processing apparatus which applies image processing including gradation conversion processing to image data, the image processing apparatus having: an image processing section for applying image processing to the image data based on each of a plurality of different gradation conversion processing characteristics, thereby generating a plurality of image-processed image data; a synthesis ratio calculating section for calculating the synthesis ratios of the plurality of image-processed image data by referencing image information of the image data prior to image processing; and a synthesis section for synthesizing the plurality of image-processed image data based on the synthesis ratios, thereby generating image data to be outputted.

9 Claims, 12 Drawing Sheets

IMAGE PROCESSING METHOD, IMAGE PROCESSING APPARATUS AND IMAGE PROCESSING PROGRAM

This is a U.S. National Phase Application under 35 U.S.C. 371 of International Application PCT/JP2006/323169 filed on Nov. 21, 2006.

This Application claims the priority of Japanese Application No. 2005-356615, filed Dec. 9, 2005, the entire content of which is hereby incorporated by reference.

FIELD OF THE INVENTION

The present invention relates to an image processing method, image processing apparatus and image processing program, particularly to an image processing method, image processing apparatus and image processing program capable of executing an appropriate gradation processing according to image data.

BACKGROUND

In the field related to medical images, an image is captured by using a radioactive photographic film made of silver halide photosensitive material. In addition to this method, there is a method of obtaining radiographic image information using a photostimulable phosphor plate, without using a radiographic film.

Further, there is widespread use of the radiographic image input apparatus such as an X-ray computerized tomography (X-ray CT apparatus) and magnetic resonance imaging apparatus (MRI apparatus) other than the plain radiograph.

When such a medical image is used for diagnosis, in addition to the transparent recording medium placed on an illumination apparatus such as a viewing box (schaukasten), image information is often recorded on a reflective type recording medium and is examined in the form of a hard copy.

As described above, there are various forms of input and output method, and this requires appropriate gradation processing to be applied to each image data. Further, depending on the target region, there is a difference in the range of signal value to be emphasized. This calls for appropriate gradation processing.

FIG. 12 is a characteristic diagram illustrating an example of a gamma conversion processing characteristic as a gradation conversion processing. When the gamma value is smaller, there is an increase in the contrast of the low brightness, and this avoids possible black crushing (black compression). In the region of high brightness, however, white crushing tends to occur. If the gamma value is greater, there is an increase in the contrast of the high brightness, and this avoids possible white crushing. In the region of low brightness, however, black crushing tends to occur.

As described above, in the process of gamma conversion using any one gamma value, gradation processing that covers the overall brightness region cannot be implemented in the conventional art.

As a method for image processing intended for the aforementioned application, a combination of a plurality of steps of gamma conversion processing is proposed in the technique disclosed in the following Patent Document 1.

Patent Document 1: Unexamined Japanese Patent Application Publication No. 2003-310602 (P.1, FIG. 1).

DISCLOSURE OF INVENTION

Problems to be Solved by the Invention

According to the method described in the Patent Document 1, the gamma value of about 0.1 is selected for the low brightness region, and the gamma value of about 2.0 is selected for the high brightness region, as shown in FIG. 13. This arrangement prevents black crushing from occurring in the region of low brightness, and white crushing does not occur in the image of high brightness region.

Thus, this arrangement appears to be preferable in the field of application wherein only the low brightness region and high brightness region are the target regions. However, in the intermediate brightness region connecting between the low and high brightness regions, the input/output characteristics are reversed. There is no accordance in the trend of the gradation conversion processing characteristics between the low and high brightness regions. This has caused the problem of deterioration in the gradation continuity.

Further, when the output brightness value alone is used for judgment, it can not be judged whether the relevant input was originally located in the low brightness region or in the high brightness region. This may lead to wrong diagnosis in the field of medical image.

The object of the present invention is to solve these problems and to perform appropriate improvement processing in each brightness region while gradation continuity is maintained.

Means for Solving the Problems

The following describes the characteristics of the present invention for solving the aforementioned problem:

1. An image processing method for applying image processing including gradation conversion to image data, the method comprising:

applying image processing to the image data based on each of a plurality of different gradation conversion processing characteristics, thereby generating a plurality of image-processed image data;

calculating synthesis ratios of a plurality of image-processed image data by referencing the image information of the image data prior to image processing; and synthesizing a plurality of image-processed image data based on the aforementioned synthesis ratios, thereby generating image data to be outputted.

2. The image processing method described in Configuration 1, wherein the synthesis ratios are calculated for each target pixel by referencing a pixel value of the target pixel as the aforementioned image information.

3. The image processing method described in Configuration 1, wherein the synthesis ratios are calculated for each target pixel by referencing a pixel value of the target pixel subsequent to smoothing of the image data as the aforementioned image information.

4. The image processing method described in any one of Configurations 1 through 3, this method comprising determining a synthesis number M according to an image characteristic of image data on applying image processing to the image data based on each of a plural number M of different gradation conversion processing characteristics and generating a plural number M of image-processed image data, wherein synthesis ratios of the plural number M of image-processed image data are calculated, and the plural number M of image-processed image data are synthesized based on the synthesis ratios, thereby the image data to be outputted is generated.

5. The image processing method described in Configuration 4, wherein the aforementioned synthesis number M is determined by referencing the dynamic range of the image data as the aforementioned image characteristic.

6. An image processing apparatus for applying image processing including gradation conversion processing to image data, the image processing apparatus including;

an image processing section for applying image processing to the aforementioned image data based on each of a plurality of different gradation conversion processing characteristics, thereby generating a plurality of image-processed image data;

a synthesis ratio calculating section for calculating synthesis ratios of the plurality of image-processed image data by referencing the image information of the image data prior to image processing; and a synthesis section for synthesizing the plurality of image-processed image data based on the aforementioned synthesis ratios, thereby generating image data to be outputted.

7. The image processing apparatus described in Configuration 6, wherein the aforementioned synthesis ratio calculating section calculates the aforementioned synthesis ratios for each target pixel by referencing a pixel value of the target pixel as the aforementioned image information.

8. The image processing apparatus described in Configuration 6, wherein the aforementioned synthesis ratio calculating section calculates the aforementioned synthesis ratios for each target pixel by referencing a pixel value of a target pixel subsequent to smoothing of the image data as the aforementioned image information.

9. The image processing apparatus described in any one of Configurations 6 through 8, wherein the image processing section determines a synthesis number M according to an image characteristic of image data when the image processing section applies image processing to the image data based on each of a plural number M of different gradation conversion processing characteristics and generates a plural number M of image-processed image data;

the synthesis ratio calculating section calculates synthesis ratios of the plural number M of image-processed image data; and the synthesis section synthesizes the plural number M of processed data based on the aforementioned synthesis ratios, thereby generates the image data to be outputted.

10. The image processing apparatus described in Configuration 9, wherein the image processing section determines the synthesis number M by referencing a dynamic range of the image data as the image characteristics.

11. An image processing program comprising a routine for executing each processing method described in any one of the aforementioned Configurations 1 through 5.

Effects of the Invention

The present invention provides the following advantages:

(1) In the invention described in configuration 1, image processing is applied to the image data based on each of a plurality of different gradation conversion processing characteristics, thereby generating a plurality of image-processed image data; the synthesis ratios of a plurality of image-processed image data are calculated by referencing image information of the image data prior to image processing; and the plurality of image-processed image data is synthesized based on the aforementioned synthesis ratios, thereby image data to be outputted is generated. Therefore each pixel of the image is processed through synthesizing appropriate gradation conversion processing characteristics, and it is possible to ensure that appropriate gradation processing is carried out in each brightness region while gradation continuity is maintained.

(2) In the invention described in configuration 2, the synthesis ratios are calculated for each target pixel by referencing the pixel value of the target pixel as the aforementioned image information. Therefore each pixel of the image is processed through synthesizing appropriate gradation conversion processing characteristics based on the pixel value, and it is possible to ensure that appropriate gradation processing is carried out in each brightness region while gradation continuity is maintained.

(3) In the invention described in configuration 3, the synthesis ratios are calculated for each target pixel by referencing a pixel value of a target pixel subsequent to smoothing of the image data as the aforementioned image information. Therefore each pixel of the image is processed through synthesizing appropriate gradation conversion processing characteristics without being affected by abrupt change of noise and others included in image data, and it is also possible to ensure that appropriate and variation-free gradation processing are carried out in each brightness region while gradation continuity is maintained.

(4) In the invention described in configuration 4, a synthesis number is determined according to an image characteristic of image data when image processing is applied to the image data based on each of a plural number M of different gradation conversion processing characteristics and the plural number M of image-processed image data are generated; the synthesis ratios of the plural number M of image-processed image data are calculated; and the plural number M of image-processed image data is synthesized based on the aforementioned synthesis ratios, thereby an image data to be outputted is generated. Therefore the image is processed through synthesizing appropriate gradation conversion processing characteristics based on the appropriate synthesis number and synthesis ratios according to the image characteristic, and it is possible to ensure that appropriate gradation processing is carried out in each brightness region while gradation continuity is maintained.

(5) In the invention described in configuration 5, the aforementioned synthesis number M is determined by referencing the dynamic range of the image data as the aforementioned image characteristic. Therefore image is processed through synthesizing appropriate gradation conversion processing characteristics based on the appropriate synthesis number and synthesis ratios according to the dynamic range as the image characteristics, and it is possible to ensure that appropriate gradation processing is carried out in each brightness region while gradation continuity is maintained.

(6) In the invention described in configuration 6, image processing is applied to the aforementioned image data based on each of a plurality of different gradation conversion processing characteristics, thereby generating a plurality of image-processed image data; the synthesis ratios of the plurality of image-processed image data are calculated by referencing the image information of the image data prior to image processing; and the plurality of image-processed image data is synthesized based on the aforementioned synthesis ratios, thereby image data to be outputted is generated. Therefore each pixel of the image is processed through synthesizing appropriate gradation conversion processing characteristics, and it is possible to ensure that appropriate gradation processing is carried out in each brightness region while gradation continuity is maintained.

(7) In the invention described in configuration 7, the aforementioned synthesis ratios are calculated for each target pixel by referencing a pixel value of a target pixel as the aforementioned image information. Therefore each pixel of the image is processed through synthesizing appropriate gradation conversion processing characteristics based on the pixel value, and it is possible to ensure that appropriate gradation processing is carried out in each brightness region while gradation continuity is maintained.

(8) In the invention described in configuration 8, the aforementioned synthesis ratios are calculated for each target pixel by referencing the pixel value of the target pixel subsequent to smoothing of the image data as the aforementioned image information. Therefore each pixel of the image is processed through synthesizing appropriate gradation conversion processing characteristics without being affected by an abrupt change of noise and others included in image data, and it is also possible to ensure that appropriate and variation-free gradation processing are carried out in each brightness region while gradation continuity is maintained.

(9) In the invention described in configuration 9, a synthesis number M is determined according to an image characteristic of image data when image processing is applied to the image data based on each of the plural number M of different gradation conversion processing characteristics and the plural number M of image-processed image data are generated; the synthesis ratios of the plural number M of image-processed image data are calculated; and the plural number M of image-processed image data is synthesized based on the aforementioned synthesis ratios, thereby an image data to be outputted is generated. Therefore the image is processed through synthesizing appropriate gradation conversion processing characteristics based on the appropriate synthesis number and synthesis ratios according to the image characteristic, and it is possible to ensure that appropriate gradation processing is carried out in each brightness region while gradation continuity is maintained.

(10) In the invention described in configuration 10, the synthesis number M is determined by referencing a dynamic range of the image data as the image characteristic. Therefore image is processed through synthesizing appropriate gradation conversion processing characteristics according to the appropriate synthesis number and the synthesis ratios in according to the dynamic range as the image characteristic, and it is possible to ensure that appropriate gradation processing is carried out in each brightness region while gradation continuity is maintained.

(11) In the invention described in configuration 11, the routine is provided to implement the processing steps of the image processing method described in any one of the aforementioned Configurations (1) through (5). Therefore each pixel of the image is processed through synthesizing appropriate gradation conversion processing characteristics, and it is possible to ensure that appropriate gradation processing is carried out in each brightness region while gradation continuity is maintained.

Further, each pixel of the image is processed through synthesizing appropriate gradation conversion processing characteristics based on the pixel value, and it is possible to ensure that appropriate gradation processing is carried out in each brightness region while gradation continuity is maintained.

Further, each pixel of the image is processed through synthesizing appropriate gradation conversion processing characteristics without being affected by abrupt change of noise and others included in image data, and it is also possible to ensure that appropriate and variation-free gradation processing are carried out in each brightness region while gradation continuity is maintained.

Further, the image is processed through synthesizing appropriate gradation conversion processing characteristics based on the appropriate synthesis number M and synthesis ratios in response to image characteristic, and it is possible to ensure that appropriate gradation processing is carried out in each brightness region while gradation continuity is maintained.

Furthermore, image is processed through synthesizing appropriate gradation conversion processing characteristics according to the appropriate synthesis number M and the synthesis ratios in response to the dynamic range as the image characteristics, and it is possible to ensure that appropriate gradation processing is carried out in each brightness region while gradation continuity is maintained.

DESCRIPTION OF REFERENCE NUMERALS

Figure 1:
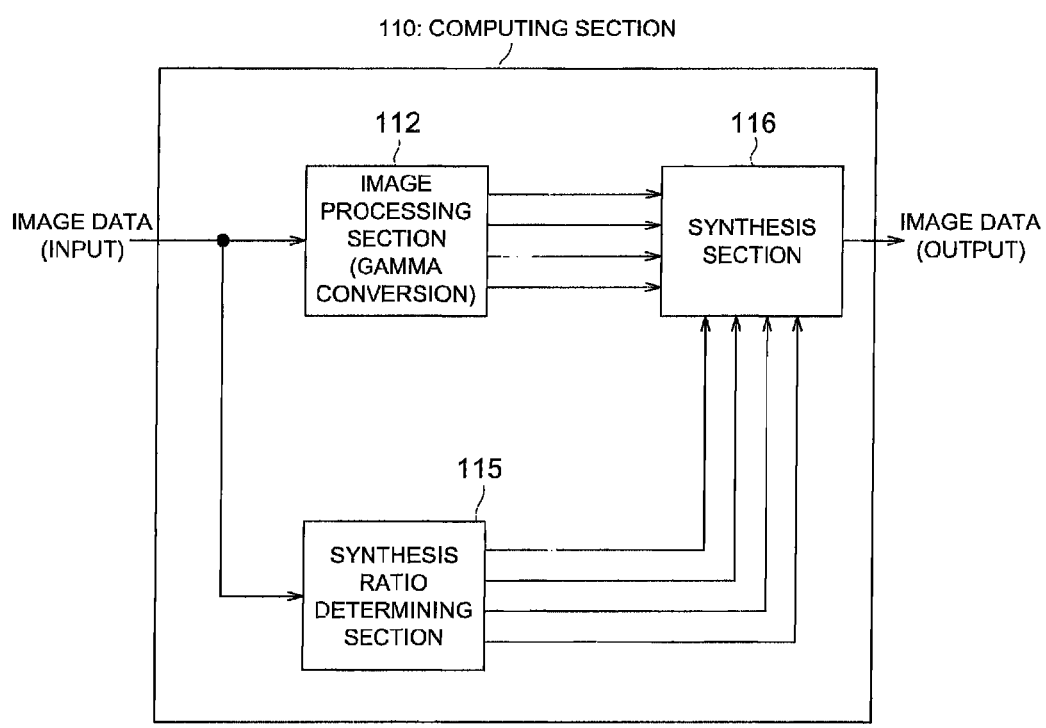
FIG. 1 is a block diagram representing an example of the functional configuration of the image processing apparatus as a first embodiment of the present invention.

100 Image processing apparatus
101 CPU
102 ROM
103 RAM
110 Computing section
111 Control section
112 Image processing section
113 Gamma determining section
114 Synthesis number determining section
115 Synthesis ratio determining section
116 Synthesis section
117 Smoothing section
170 Operation section
180 Display section
190 HDD

BEST FORM OF EMBODIMENT OF THE PRESENT INVENTION

The following describes the details of the best form of the embodiment (hereinafter referred to as "embodiment") with reference to drawings:

Referring to FIG. 1, the following describes the image processing method, image processing apparatus and image processing program of the present invention with reference to the first embodiment wherein the image processing program is applied to the image processing apparatus, and shows a specific example of the electrical configuration.

In the present embodiment, the operation of the image processing apparatus is based on the procedure of the image processing method, and the image processing program execution procedure represents the operation of the image processing apparatus or the processing procedure of the image processing method.

Figure 2:
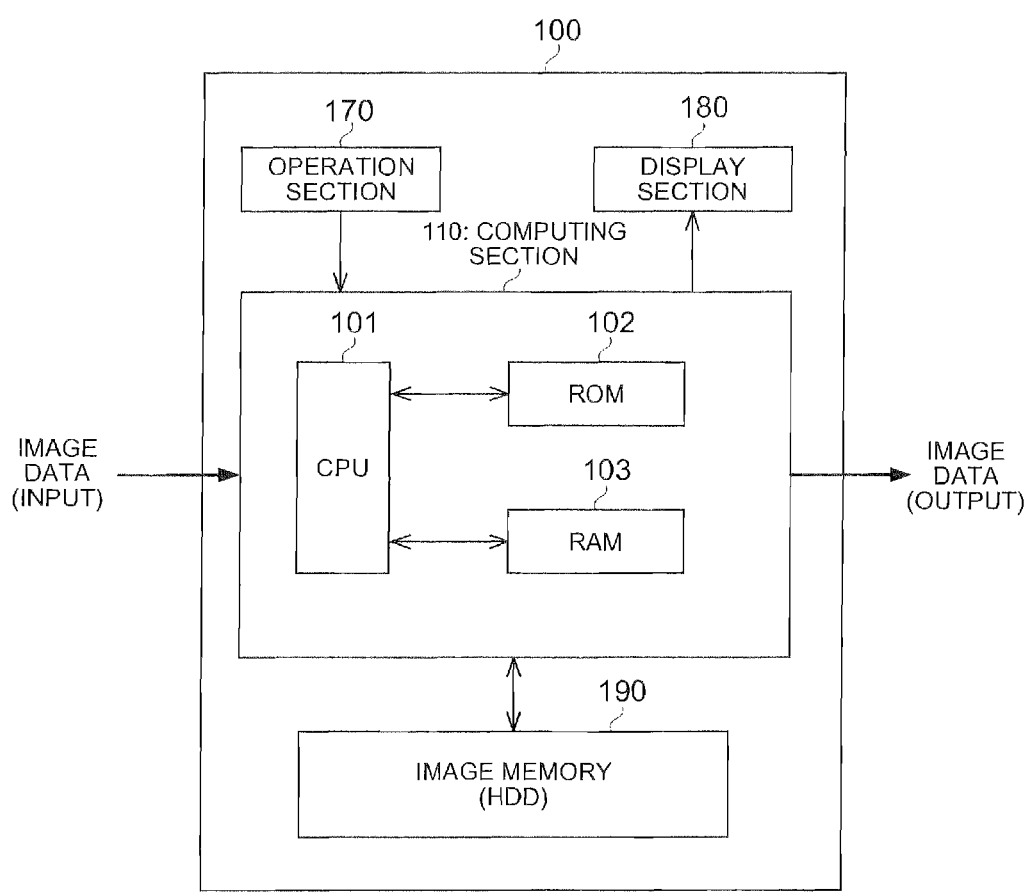
FIG. 2 is a block diagram representing an example of a specific apparatus configuration of the image processing apparatus as a first embodiment of the present invention.

The image processing apparatus includes the following configurations: FIG. 1 is a functional block diagram representing an example of the configuration of the major sections of the image processing apparatus in the present embodiment. FIG. 2 is a block diagram representing an example of a specific circuit and apparatus constituting the image processing apparatus. The image processing apparatus is designed to implement the image processing method and to include various routines for image processing program.

Embodiment 1

The reference numeral 110 denotes a computing section for computation processing in the image processing apparatus 100 (FIG. 2). In the image processing apparatus 100, this computing section 110 applies image processing to the image data based on each of a plurality of different gradation conversion processing characteristics to generate a plurality of image-processed image data, and calculates synthesis ratios of a plurality of image-processed image data, by referencing the image information of the image data prior to image processing. The computing section 110 then synthesizes a plurality of image-processed image data based on the synthesis ratios, thereby generating the image data to be outputted.

In terms of functions, this computing section 110 includes at least an image processing section 112 for processing an image, a synthesis ratio determining section 115 for determining the synthesis ratios, and an image synthesis section 116 for synthesizing an image.

Based on each of a plurality of different gradation conversion processing characteristics (gamma characteristics), the image processing section 112 applies image processing to the image data to generate a plurality of image-processed image data.

By referencing the image information of the image data prior to image processing, the synthesis ratio determining section 115 determines the synthesis ratios of the plurality of image-processed image data. The image information of the image data in the sense in which it is used here refers to the pixel value of the target pixel. The image information of the image data also refers to the pixel value of the target pixel subsequent to smoothing.

Based on the aforementioned synthesis ratios, the synthesis section 116 synthesizes a plurality of image-processed image data, for each target pixel, and generates the image data to be outputted, while maintaining gradation continuity, wherein this image data has been subjected to appropriate gradation processing in each brightness region.

In FIG. 2, the image processing apparatus 100 includes the following components as hardware:

The computing section 110 including the image processing section 112, synthesis ratio determining section 115 and image synthesis section 115 incorporates a CPU 101 as a control device for controlling each section, a ROM 102 for storing various forms of data and programs and a RAM 103 as a work area wherein image data is displayed and processed.

The reference numeral 170 denotes an operation section whereby a operator (user) inputs various forms of instruction into the image processing apparatus 100, and 180 indicates the display section for displaying various statuses of the image processing apparatus 100. The reference numeral 190 is an HDD wherein image data and various forms of data are stored.

The number of the gradation conversion processing characteristics and the number of the image-processed image data to be generated thereby are fixed in the aforementioned example. However, they can be designed as variable numbers. To be more specific, steps are taken to determine a synthesis number M according to the image characteristics of image data and to apply image processing to the image data based on each of the plural number M of different gradation conversion processing characteristics to generate the plural number M of image-processed image data. This is followed by the step of calculating the synthesis ratios of the plural number M of the image-processed image data and synthesizing the plural number M of the image-processed image data based on the synthesis ratios, thereby generating the image data to be outputted.

Figure 3:
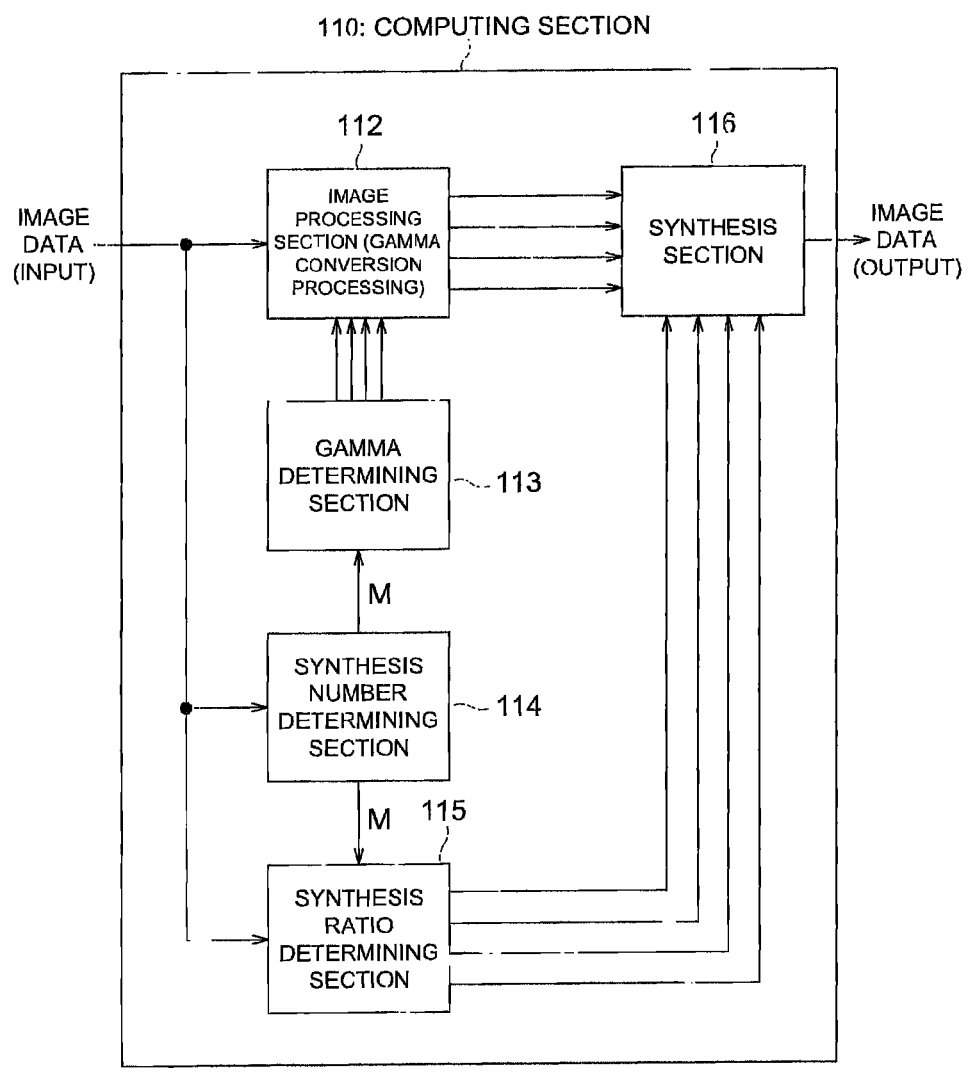
FIG. 3 is a block diagram representing an example of the functional configuration of the image processing apparatus as a first embodiment of the present invention, this configuration being characterized in that the synthesis number is variable.

In this case, as shown in FIG. 3, the synthesis number determining section 114 determines the number to be synthesized M in response to the image characteristics of the image data such as a dynamic range. The gamma determining section 113 determines the plural number M of different gradation conversion processing characteristics. The image processing section 112 applies image processing to image data according to each of the plural number M of different gradation conversion processing characteristics (gamma characteristics), whereby a plurality of image-processed image data is generated. By referencing the image information of the image data prior to image processing, the synthesis ratio determining section 115 determines the synthesis ratios of the plural number M of the image-processed image data. Based on the aforementioned synthesis ratios, the synthesis section 116 synthesizes the plural number M of the image-processed image data, for each target pixel, and generates the image data to be outputted, while maintaining gradation continuity, wherein this image data has been subjected to appropriate gradation processing in each brightness region.

Figure 4:
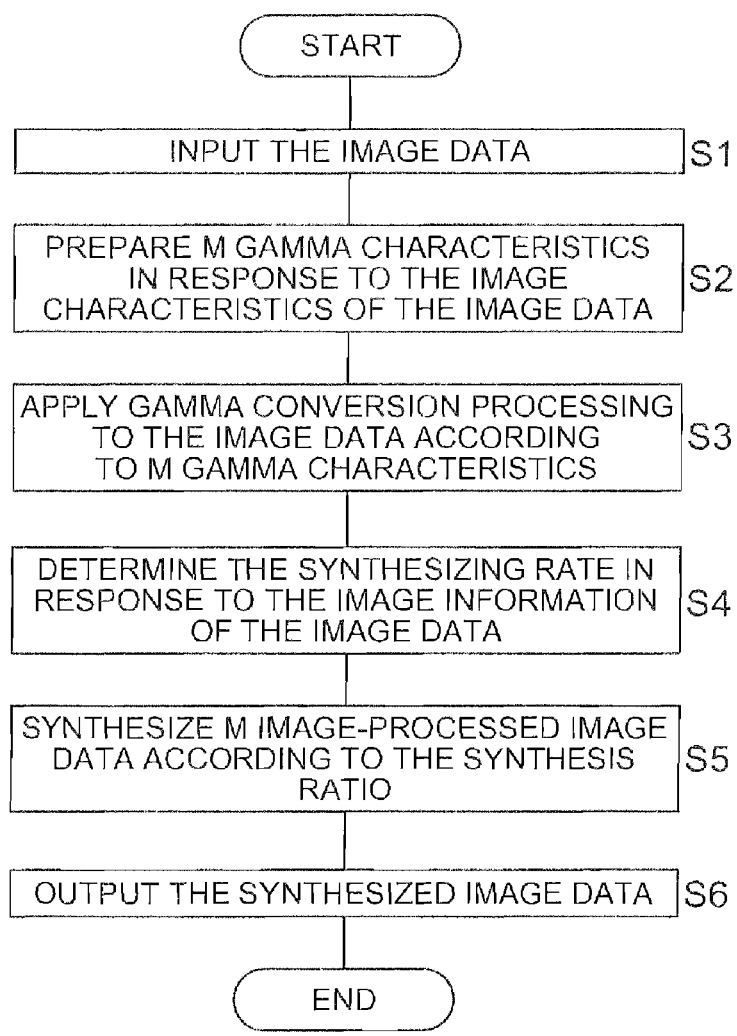
FIG. 4 is a flow chart showing an example of the operation (procedures of the image processing method and image processing program) of the image processing apparatus as a first embodiment of the present invention.

Referring to the flow chart of FIG. 4, the following describes the operation of the image processing apparatus 100 having the computing section 110 of the configuration shown in FIG. 1 or FIG. 3, the procedure of the image processing method in the image processing apparatus 100, and the execution procedure of the image processing program.

This image processing apparatus 100 receives colored or monochromatic image data from an image capturing apparatus (not illustrated) and others. The image processing apparatus 100 can receive image data directly from the image capturing apparatus, or can receive the image data stored in the image data storage apparatus. Further, it can be connected with the image capturing apparatus or image data storage apparatus directly or through the network.

In the first place, the image processing apparatus 100 receives colored or monochromatic image data from an image capturing apparatus or image storage apparatus (not illustrated) (S1 in FIG. 4). The image data received by the image processing apparatus 100 in this manner is stored in an HHD 190.

In response to the width of the dynamic range of the image data having been received, the synthesis number determining section 114 determines the synthesis number M used to synthesize the image-processed image data. Here the plural number M refers to the synthesis number. However, it can be the number of different gradation conversion processing characteristics or the number of the image data processed according to different gradation conversion processing characteristics. Based on the plural number M having been determined, the gamma determining section 113 determines the gamma for the plural number M different gradation conversion processing characteristics (gamma characteristics) (S2 in FIG. 4).

To be more specific, as the dynamic range of the image data is wider, the difference in each synthesis value tends to be greater at the time of synthesis (to be described later). An abrupt change may occur between the adjustment pixels, depending on a change in pixel value. Thus, the synthesis number determining section 114 determines the plural number M in such a way that the value M will be greater as the dynamic range is wider. For example, numeral 3 through 10 can be assigned in response to the variation in the permissible dynamic range.

Figure 5:
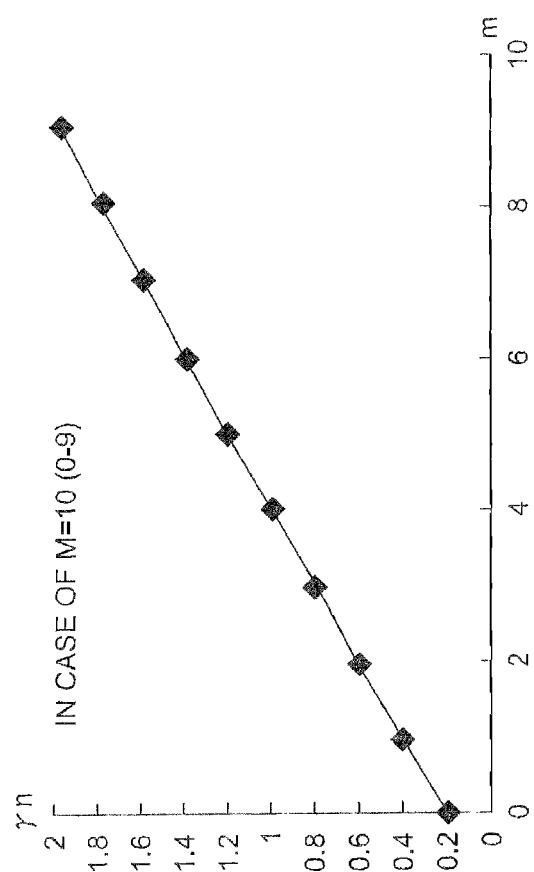
FIG. 5 is a diagram showing an example of the gamma characteristics when M=10 in the image processing apparatus of the present embodiment of the invention.

FIG. 5 shows an example of gamma characteristic when M=10 (0 through 9). Here M $\gamma_m$'s are prepared wherein n=0 through 9. These $\gamma_m$'s are defined by the following Mathematical Formula (1):

[Mathematical Formula 1]

$$\gamma_m = n \cdot a + b \quad (1)$$

wherein a>0, b>0, n is a positive integer, and m is 3 through M.

In this case, a plurality of different $\gamma_m$'s lie at an equally spaced interval. "a" indicates the magnitude of the interval, and "b" represents the minimum $\gamma$ value. The minimum $\gamma$ value is preferably smaller than 1. The interval "a" of different $\gamma_m$'s is preferably in the range from 0.1 through 0.5 to ensure that there will be no abrupt change subsequent to synthesis. Further, the aforementioned M is preferably determined so as to get such "a".

Based on each of the plural number M of different gamma characteristics, the image processing section 112 applies image processing (gamma conversion processing) to the image data, and generates the plural number M of the image-processed image data (S3 in FIG. 4).

In the following description, "image-processed image data" will be referred to as "gamma converted image data", and "the plural number M of the image-processed image data" will be referred to as "the plural number M of gamma converted image data".

This image processing (gamma conversion processing) is preferably carried out, as shown in the following Formula (2).

[Mathematical Formula 2]

$$I\gamma_m = \left(\frac{I - I_{min}}{I_{max} - I_{min}}\right)^{\gamma_m} \cdot (I_{max} - I_{min}) + I_{min} \quad (2)$$

wherein $I_{max}$, $I_{min}$ and I indicate the maximum brightness value of original image, the minimum brightness value of original image and the brightness value of the target pixel, respectively.

The synthesis ratios of the plural number M of gamma converted image data are calculated by reference to the image information of the image data prior to image processing (S4 in FIG. 4). The pixel value of the target pixel corresponds to the image information.

Figure 6:
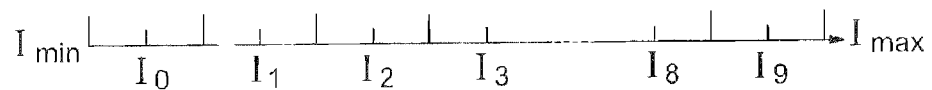
FIG. 6 is a diagram showing an example of division wherein the brightness region of the original image is divided into M equal parts and the median value Im of each divided region is calculated, in the image processing apparatus of the present embodiment of the invention.

To put it specifically, the brightness region of the original image is divided into the plural number M of equal parts and the intermediate value $I_m$ of each divided region is calculated. FIG. 6 shows an example of division.

As shown in the following Formula (3), the synthesis ratio determining section 115 determines the synthesis ratios of the plural number M of gamma converted image data according to the brightness value I of each target pixel of the original image (S4 in FIG. 4). To put it another way, the synthesis ratio determining section 115 determines the synthesis ratios of the plural number M of gamma converted image data for each pixel.

[Mathematical Formula 3]

$$f(I) = e^{\frac{(I_m - I)^2}{2\sigma^2}} \quad (3)$$

where $\sigma$ indicates a constant.

The constant $\sigma$ in Formula (3) determines the number of the gamma converted image data wherein the weighing factor is increased at the time of synthesis. When this constant $\sigma$ is greater, the range of synthesis is increased, and a great number of gamma converted image data are added to one another, with the result that a gentler curve is obtained without abrupt change. However, this includes the possibility of the contrast being reduced. To eliminate this possibility, it is preferred to assume the value $\sigma$ shown in the following Formula (4).

[Mathematical Formula 4]

$$\frac{2(I_{max} - I_{min})}{M} \quad (4)$$

When the constant $\sigma$ and synthesis ratios have been determined by the synthesis ratio determining section 115, the synthesis section 116 synthesizes the plural number M of gamma converted image data, as shown in the following Formula (5), thereby generating the image data to be outputted (S5 in FIG. 4).

[Mathematical Formula 5]

$$I' = \sum_{m=0}^{M} f(I) \quad (5)$$

The aforementioned procedure allows image processing to be carried out for each pixel by the synthesis of the appropriate gradation conversion processing characteristics. Thus, appropriate gradation processing can be carried out in each brightness region while the gradation continuity is maintained.

At the time of synthesis, the synthesis methods of the approximated gradation values are approximate to each other, and the gamma converted image data wherein the gamma values are approximate with each other have greater synthesis ratios. Accordingly, there is no abrupt change in the image data subsequent to synthesis, and the gradation conversion processing characteristic curve having been synthesized becomes smooth.

Figure 7:
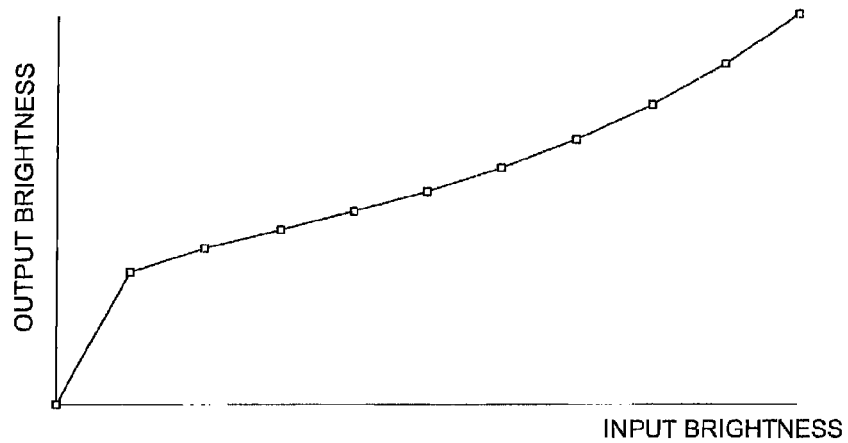
FIGS. 7(a) and 7(b) are diagrams showing an example of the synthesized gradation conversion processing characteristic curves in the image processing apparatus of the present embodiment of the invention.
Figure 7:
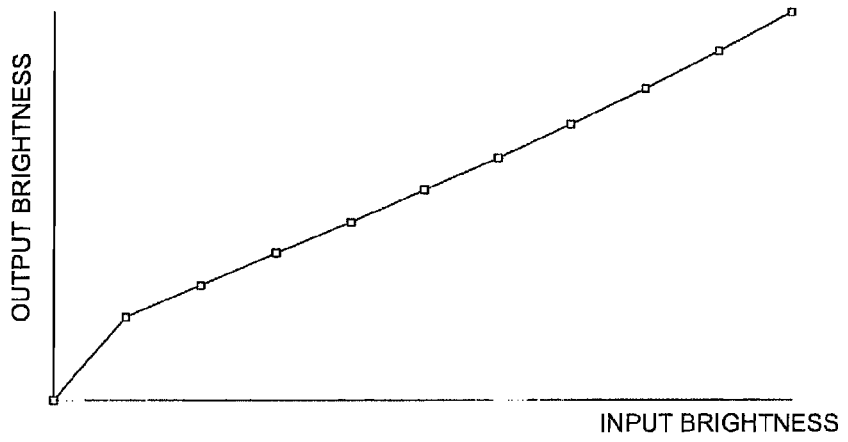

FIG. 7 is a diagram showing an example of the synthesized gradation conversion processing characteristic curve in the image processing apparatus of the present embodiment of the invention. FIG. 7(a) is a synthesis curve wherein u is smaller. FIG. 7(b) is a synthesis curve wherein σ is greater. If σ is smaller as a gradation conversion processing characteristic curve, there will be an abrupt inclination between the low and high brightness regions, as shown in FIG. 7(a). If the σ is still smaller, gradation reversing will occur in the intermediate brightness region. In this case, some restriction is preferably imposed to eliminate the possibility of reversing.

If the σ is greater as the synthesized gradation conversion processing characteristic curve, a gentle inclination will be exhibited, as shown in FIG. 7(b). There will be no abrupt inclination, as compared to FIG. 7(a). An overall gentle characteristic can be observed.

As described above, adjustment of σ allows the inclination of the gradation conversion processing characteristic curve to be controlled within a desired input brightness region.

In the input brightness region to be emphasized, reducing of the σ will provide the gradation conversion processing characteristic curve wherein that region is emphasized.

Figure 8:
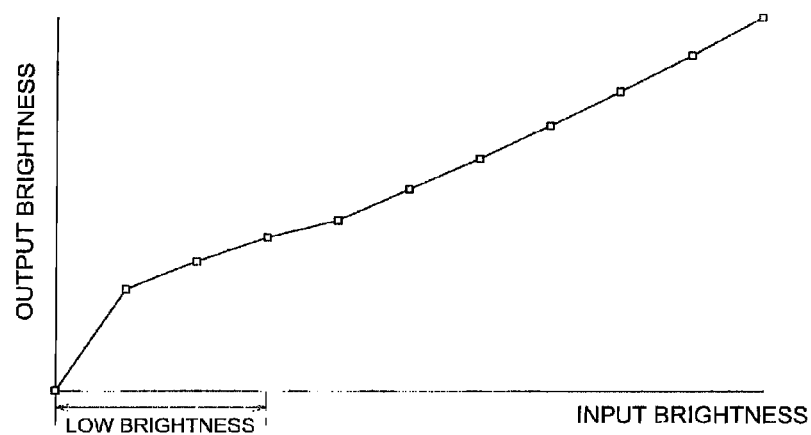
FIGS. 8(a), 8(b) and 8(c) are diagrams showing examples of the gradation conversion processing characteristic curves wherein a specific region is enhanced in the image processing apparatus of the present embodiment of the invention.
Figure 8:
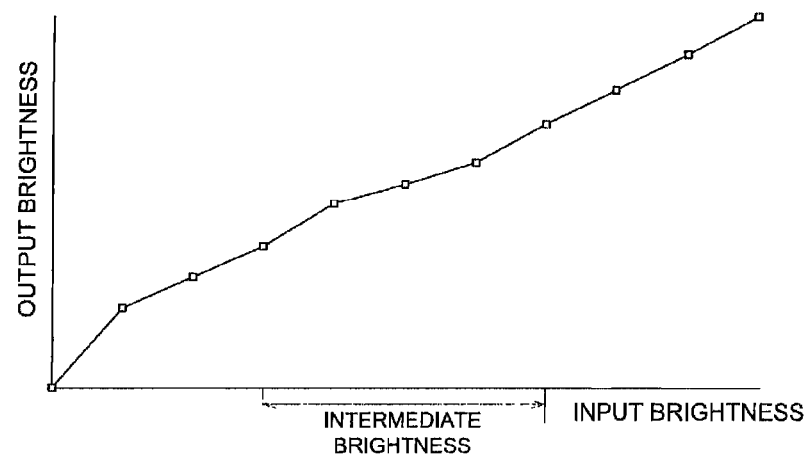
Figure 8:
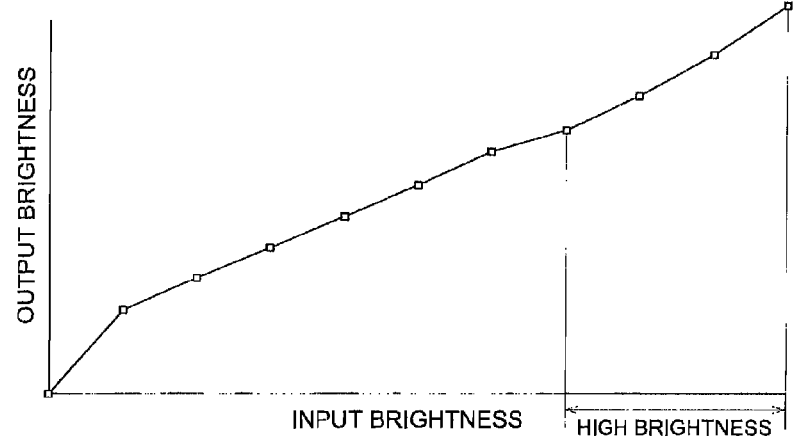

FIG. 8(a) shows the characteristics wherein the low brightness region is emphasized, FIG. 8(b) represents the characteristics wherein the intermediate brightness region is emphasized, and FIG. 8(c) represents the characteristics wherein the high brightness region is emphasized.

As described above, adjustment of σ in a desired input brightness region ensures the inclination of the gradation conversion processing characteristic curve to be controlled in a desired input brightness region.

To put it another way, in the present specification, "appropriate gradation processing" can be defined as carrying out gradation conversion by implementing the characteristics wherein a desired input brightness region is emphasized, while the gradation continuity is maintained without allowing gradation reversing.

Figure 9:
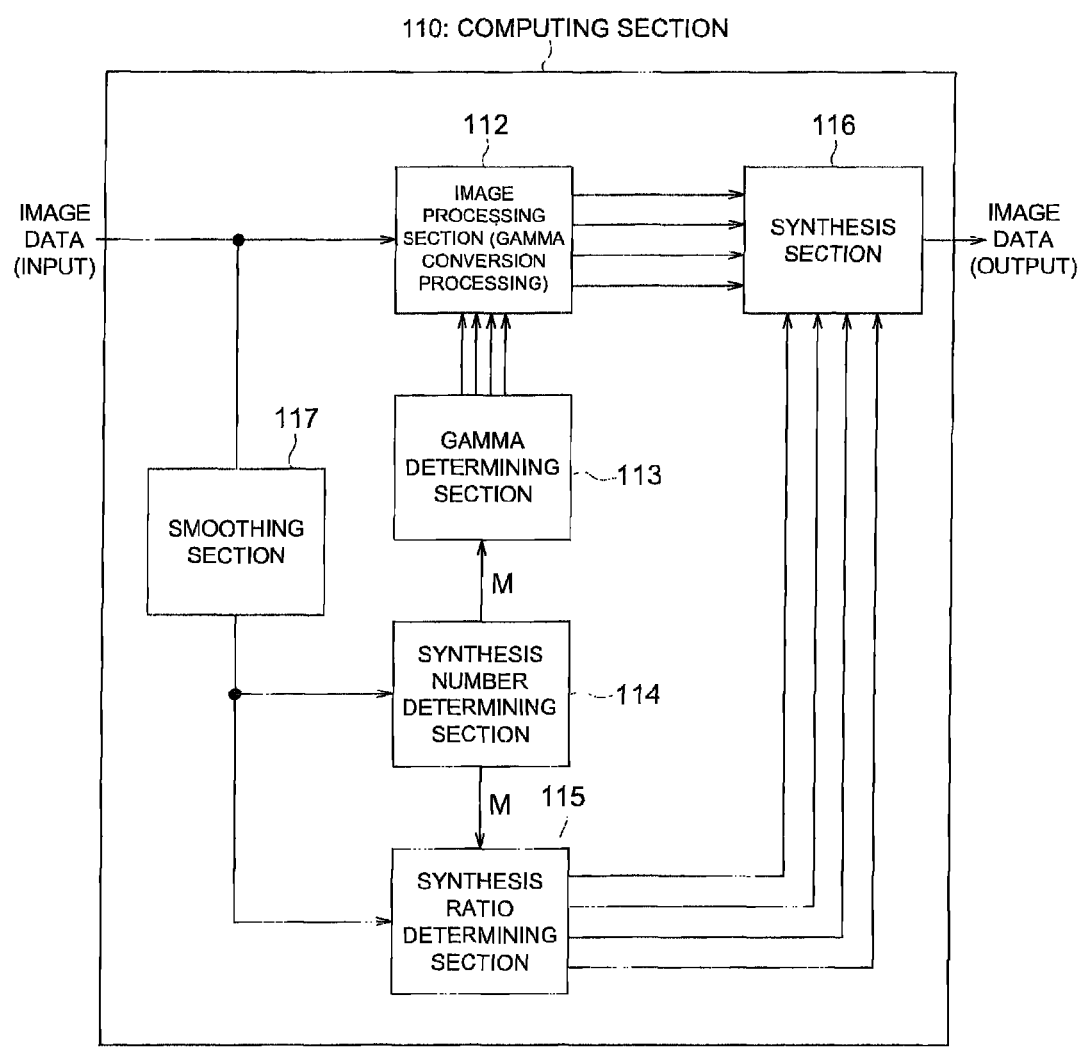
FIG. 9 is a block diagram representing an example of the functional configuration of the image processing apparatus as a second embodiment of the present invention.

As shown in FIG. 9, the smoothing section 117 is arranged in the pre-stage of the synthesis ratio determining section 115 or in the pre-stages of the synthesis number determining section 114 and synthesis ratio determining section 115. Based on the image data having been smoothed by the smoothing section 117 (S4 in FIG. 10), the synthesis number determining section 114 determines the synthesis number M and the synthesis ratio determining section 115 determines the synthesis ratios (S5 in FIG. 10). This procedure is also preferred. At least, it is preferred that the smoothing section 117 should be arranged in the pre-stage of the synthesis ratio determining section 115, and, based on the image data smoothened by the smoothing section 117 (S4 in FIG. 10), the synthesis ratio determining section 115 should determine the synthesis ratios (S5 in FIG. 10). In this case, a Gaussian filter can be used in the smoothing section 117.

To put it more specifically, the brightness region of the original image smoothed by the smoothing section 117 is divided into M equal parts, and the intermediate value Im of each divided region is calculated. After that, as shown in the following Formula (6), the synthesis ratio determining section 115 determines the synthesis ratios of the M gamma converted image data according to the brightness value of each target pixel off the original image having been smoothed.

[Mathematical Formula 6]

$$f(I) = e^{\frac{(I_m - I)^2}{2\sigma^2}} \quad (6)$$

wherein σ indicates a constant.

The constant σ in Formula (6) determines the number of the gamma converted image data wherein the weighing factor is increased at the time of synthesis. When this constant σ is larger, the range of synthesis is increased, and a large number of gamma converted image data are added to one another, with the result that a gentler curve is obtained without abrupt change. However, this includes the possibility of the contrast being reduced. To eliminate this possibility, it is preferred to assume the value σ shown in the following Formula (7).

[Mathematical Formula 7]

$$\frac{2(\bar{I}_{max} - \bar{I}_{min})}{M} \quad (7)$$

Figure 10:
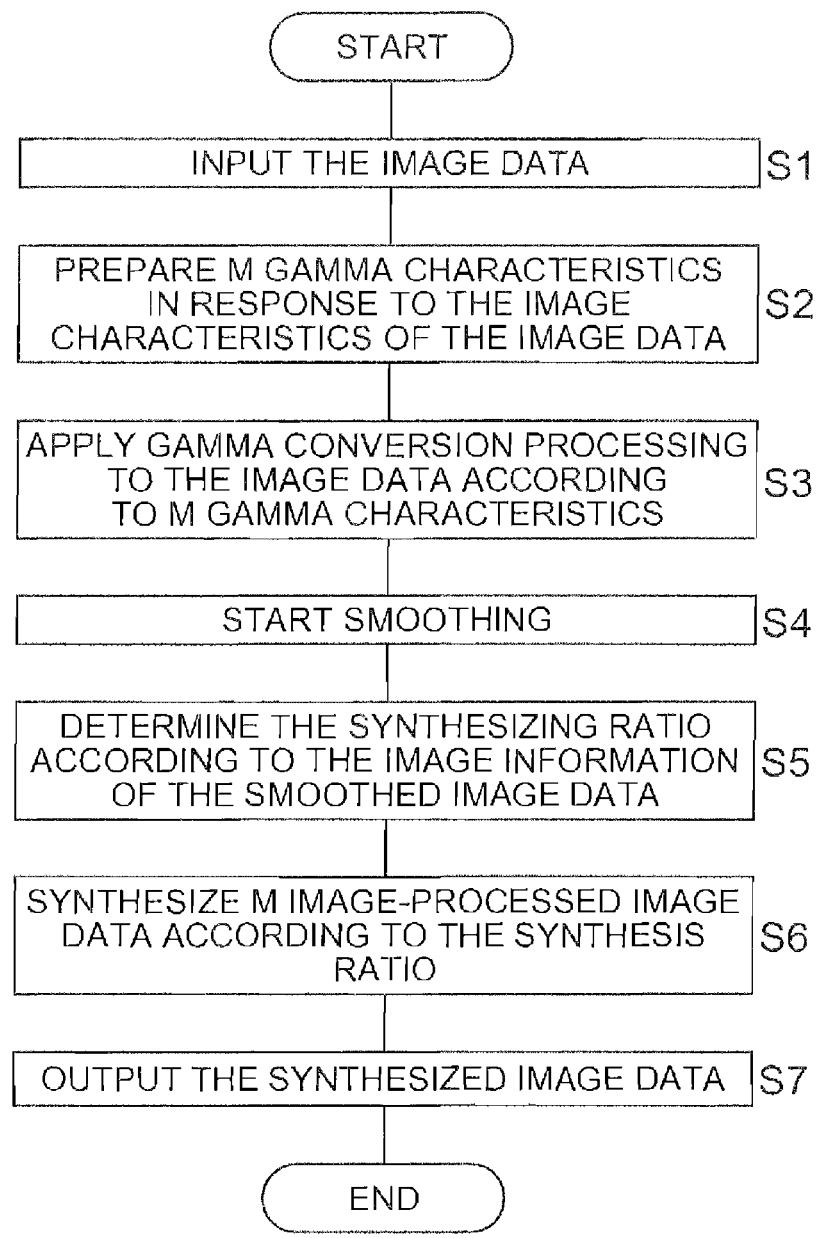
FIG. 10 is a flow chart showing an example of the operation (procedures of the image processing method and image processing program) of the image processing apparatus as a second embodiment of the present invention.

When the constant σ and synthesis ratio have been determined by the synthesis ratio determining section 115 in the aforementioned manner, the synthesis section 116 synthesizes plural number M of gamma converted image data according to the aforementioned Formula (5), and generates the image data to be outputted (S6 in FIG. 10).

According to the aforementioned procedure, image processing is carried out by the synthesis of the appropriate gradation conversion processing characteristics for each pixel. Thus, appropriate gradation processing can be carried out in each brightness region, while gradation continuity is maintained, without being affected by an abrupt change in the noise and other factors contained in the image data.

Figure 11:
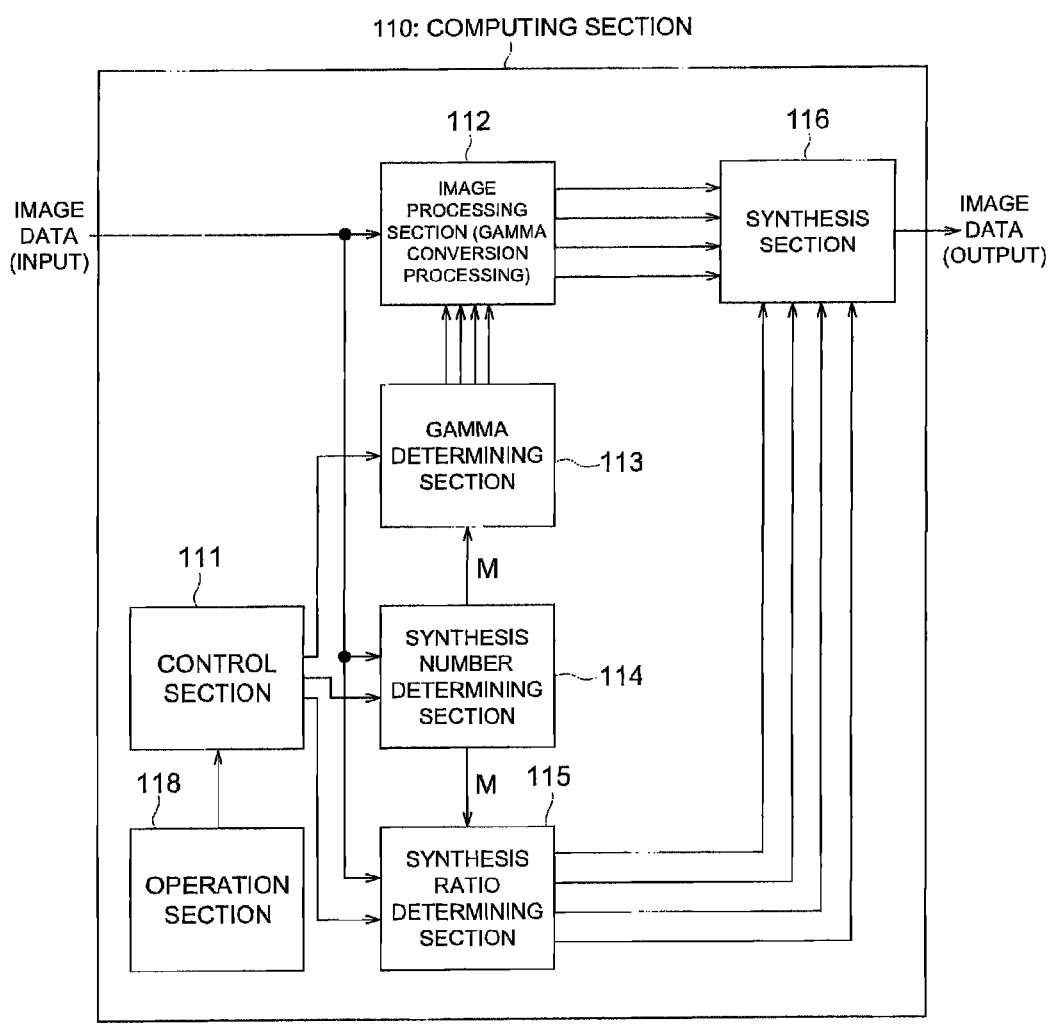
FIG. 11 is a block diagram representing an example of the functional configuration of the image processing apparatus as a third embodiment of the present invention.
Figure 12:
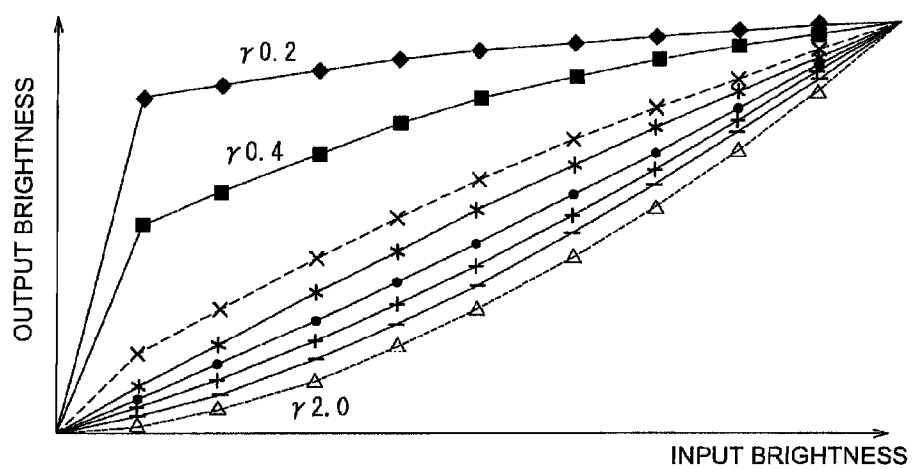
FIG. 12 is a diagram showing an example of the gradation conversion processing characteristic curves.
Figure 13:
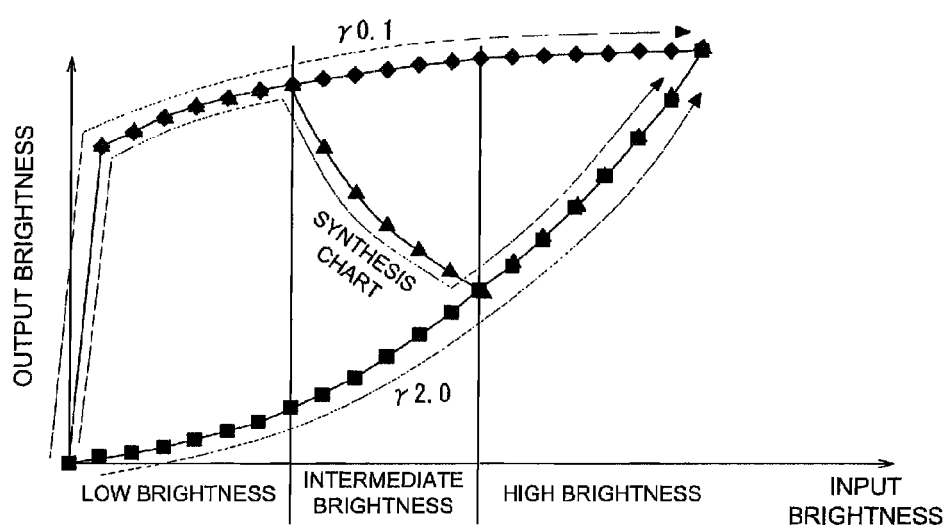
FIG. 13 is a diagram showing another example of the gradation conversion processing characteristic curves.

It is also possible to install an operation section 118 to perform various forms of operations and to input instructions, and a control section 111 so that the synthesis number M and value for σ can be set by the operator, as shown in FIG. 11.

In each of the aforementioned embodiments, gradation conversion processing (γ conversion processing) can be applied to either the brightness component or color component of the image data.

The invention claimed is:

1. An image processing method which applies image processing including gradation conversion processing to image data, the image processing method comprising:
   determining a synthesis number M according to an image characteristic of image data;
   generating a plural number M of image-processed image data by applying image processing to the image data based on each of a plural number M of different gradation conversion processing characteristics;
   calculating synthesis ratios of the plural number M of image-processed image data by referencing image information of the image data prior to image processing; and
   synthesizing the plural number M of image-processed image data based on the synthesis ratios, thereby generating image data to be outputted.

2. The image processing method according to claim 1, wherein the synthesis ratios for each target pixel are calculated by referencing a pixel value of the target pixel as the image information.

3. The image processing method according to claim 1, wherein the synthesis ratios for each target pixel are calculated by referencing a pixel value of a target pixel subsequent to smoothing of the image data as the image information.

4. The image processing method according to claim 1, wherein the synthesis number M is determined by referencing a dynamic range of the image data as the image characteristic.

5. An image processing apparatus which applies image processing including gradation conversion processing to image data, the image processing apparatus comprising:
   an image processing section which determines a synthesis number M according to an image characteristic of image data, and generates a plural number M of image-processed image data by applying image processing to the image data based on each of a plural number M of different gradation conversion processing characteristics;
   a synthesis ratio calculating section which calculates synthesis ratios of the plural number M of image-processed image data by referencing image information of the image data prior to image processing; and
   a synthesis section which synthesizes the plural number M of image-processed image data based on the synthesis ratios, thereby generates image data to be outputted.

6. The image processing apparatus according to claim 5, wherein the synthesis ratio calculating section calculates the synthesis ratios for each target pixel by referencing the pixel value of the target pixel as the image information.

7. The image processing apparatus according to claim 5, wherein the synthesis ratio calculating section calculates the synthesis ratios for each target pixel by referencing a pixel value of the target pixel subsequent to smoothing of the image data as the image information.

8. The image processing apparatus according to claim 5, wherein the image processing section determines the synthesis number M by referencing a dynamic range of the image data as the image characteristic.

9. A computer readable memory storing an image processing program comprising a routine for executing each processing of an image processing method which applies image processing including gradation conversion processing to image data, the image processing method comprising:
   determining a synthesis number M according to an image characteristic of image data;
   generating a plural number M of image-processed image data by applying image processing to the image data based on each of a plural number M of different gradation conversion processing characteristics
   calculating synthesis ratios of the plural number M of image-processed image data by referencing image information of the image data prior to image processing; and
   synthesizing the plural number M of image-processed image data based on the synthesis ratios, thereby generating image data to be outputted.

* * * * *